(12) United States Patent
Miftakhov (10) Patent No.: US 10,946,760 B2
(45) Date of Patent: Mar. 16, 2021

(54) REMOTE INDICATOR OF STATE OF CHARGING OF ELECTRIC VEHICLE

(71) Applicant: Enel X North America, Inc., Boston, MA (US)

(72) Inventor: Valery Miftakhov, San Carlos, CA (US)

(73) Assignee: Enel X North America, Inc., Boston, MA (US)

( * ) Notice: Subject to any disclaimer, the term of this patent is extended or adjusted under 35 U.S.C. 154(b) by 74 days.

(21) Appl. No.: 15/690,276

(22) Filed: Aug. 29, 2017

(65) Prior Publication Data

US 2019/0061549 A1    Feb. 28, 2019

(51) Int. Cl.
| | |
|---|---|
| *H02J 7/00* | (2006.01) |
| *H02J 7/14* | (2006.01) |
| *B60L 53/65* | (2019.01) |
| *B60Q 3/64* | (2017.01) |
| *B60L 53/16* | (2019.01) |
| *B60L 53/64* | (2019.01) |
| *B60L 53/62* | (2019.01) |

(52) U.S. Cl.
CPC ............... *B60L 53/65* (2019.02); *B60L 53/16* (2019.02); *B60L 53/62* (2019.02); *B60L 53/64* (2019.02); *B60Q 3/64* (2017.02); *B60L 2240/70* (2013.01); *B60L 2250/16* (2013.01)

(58) Field of Classification Search
USPC ......................................... 320/109, 107, 108
See application file for complete search history.

(56) References Cited

U.S. PATENT DOCUMENTS

| 8,362,739 B2* | 1/2013 | Perot | ....................... | H02J 3/383 |
| | | | | 136/244 |
| 2011/0175569 A1* | 7/2011 | Austin | .................. | B60L 53/305 |
| | | | | 320/109 |
| 2011/0204847 A1* | 8/2011 | Turner | ................... | G06Q 30/02 |
| | | | | 320/109 |
| 2011/0234149 A1* | 9/2011 | Hoshi | ...................... | B62J 19/00 |
| | | | | 320/101 |
| 2012/0265459 A1* | 10/2012 | Sfaelos | ................. | B60L 53/305 |
| | | | | 702/61 |
| 2012/0293122 A1* | 11/2012 | Murawaka | ............ | B60L 53/305 |
| | | | | 320/109 |
| 2013/0020992 A1* | 1/2013 | Wu | ....................... | H01M 10/44 |
| | | | | 320/109 |

(Continued)

OTHER PUBLICATIONS

Michael, Craig, "What is Telematics?" Jan. 8, 2018, Geotab https://www.geotab.com/blog/what-is-telematics/ (Year: 2018).*

*Primary Examiner* — Alexis B Pacheco
(74) *Attorney, Agent, or Firm* — Stoel Rives LLP (57) ABSTRACT

A remote visual indicator of a state of charging of an electric and/or plug-in hybrid electric vehicle (EV and PHEV). In one or more embodiments, the aforesaid visual indicator incorporates a multi-color light source, such as a multi-color LED and uses the color of the emitted light to indicate the state of the EV/PHEV charging. In one or more embodiment, the aforesaid visual indicator incorporates one or more buttons or other user-activated controls configured to alter the charging of the EV/PHEV by the charging stations. In one or more embodiments, a sound generation element may be additionally provided for creating audible indicators of charging state.

20 Claims, 4 Drawing Sheets

(56) References Cited

U.S. PATENT DOCUMENTS

| | | | |
|---|---|---|---|
| 2013/0024306 A1* | 1/2013 | Shah | G06Q 20/32 |
| | | | 705/17 |
| 2013/0169227 A1* | 7/2013 | Tremblay | B60L 53/50 |
| | | | 320/109 |
| 2013/0274974 A1* | 10/2013 | Kusumi | B60L 58/12 |
| | | | 701/22 |
| 2014/0062381 A1* | 3/2014 | Teggatz | H02J 7/025 |
| | | | 320/101 |
| 2014/0180922 A1* | 6/2014 | Kim | B60L 11/1824 |
| | | | 705/44 |
| 2014/0232327 A1* | 8/2014 | Hasegawa | H02J 7/0027 |
| | | | 320/107 |
| 2014/0375247 A1* | 12/2014 | Chauhdary | G06Q 50/30 |
| | | | 320/106 |
| 2015/0102762 A1* | 4/2015 | Goei | H02J 7/355 |
| | | | 320/101 |
| 2015/0318724 A1* | 11/2015 | Brockman | H02J 7/0047 |
| | | | 320/152 |
| 2015/0318725 A1* | 11/2015 | Brockman | H02J 7/0047 |
| | | | 340/636.1 |
| 2016/0056664 A1* | 2/2016 | Partovi | H02J 7/025 |
| | | | 307/104 |
| 2016/0090052 A1* | 3/2016 | Nishijima | B60L 58/14 |
| | | | 307/9.1 |
| 2016/0144728 A1* | 5/2016 | Harper | B60L 50/51 |
| | | | 320/109 |

\* cited by examiner

REMOTE INDICATOR OF STATE OF CHARGING OF ELECTRIC VEHICLE

BACKGROUND OF THE INVENTION

Field of the Invention

The disclosed embodiments relate in general to electric vehicle charging technology, and, more specifically, to a remote visual indicator of a state of charging of an electric vehicle.

Description of the Related Art

Electric and plug-in hybrid electric vehicles (EV and PHEV) are customarily charged using a charging station installed in a garage or a carport and connected to the EV/PHEV using a power cord and an electric plug. To view the state of EV/PHEV charging today, the EV/PHEV owners need to come to and get inside the vehicle, read the state of charge from the vehicle charging station or open a mobile application, which all require a number of manual steps to be performed by the user. If the owner is preoccupied with some other task, such as household work, keeping track of EV/PHEV charging becomes a challenge.

Accordingly, in view of the above shortcomings and inconveniences of the conventional technology, it would be desirable to have a remote EV/PHEV charge indicator that could be positioned anywhere in the house and would seamlessly deliver the EV/PHEV state of charge information to the user preoccupied with other tasks. It would be further desirable to enable the user to control at least some aspects of the EV/PHEV charging process using the aforesaid EV/PHEV charge indicator.

SUMMARY OF THE INVENTION

The inventive methodology is directed to methods and systems that substantially obviate one or more of the above and other problems associated with conventional EV/PHEV charging technology.

In accordance with one aspect of the embodiments described herein, there is provided a system for charging an electric or hybrid-electric vehicle, the system comprising: at least one vehicle charging station electrically connectable to the vehicle and operable to charge the vehicle using an electrical power; a visual indicator of a state of charge of the vehicle; and a control server comprising at least one processing unit and a memory and communicatively coupled to the at least one vehicle charging station and the visual indicator of the state of charge of the vehicle, wherein the visual indicator of the state of charge of the vehicle is operable to receive information on the state of charge of the vehicle from the control server and to provide the received information to the user.

In one or more embodiments, the visual indicator comprises a multi-color light emitting diode.

In one or more embodiments, a light color emitted by the multi-color light emitting diode is indicative of the state of charge of the vehicle.

In one or more embodiments, green light color of the light color emitted by the multi-color light emitting diode indicates high level of vehicle charging.

In one or more embodiments, yellow light color of the light color emitted by the multi-color light emitting diode indicates medium level of vehicle charging.

In one or more embodiments, red light color of the light color emitted by the multi-color light emitting diode indicates low level of vehicle charging.

In one or more embodiments, a light color emitted by the multi-color light emitting diode is indicative of a quality of grid power used in the vehicle charging.

In one or more embodiments, a light color emitted by the multi-color light emitting diode is indicative of a percentage of renewable power used in the vehicle charging.

In one or more embodiments, green light color of the light color emitted by the multi-color light emitting diode indicates high percentage of renewable power used in the vehicle charging.

In one or more embodiments, yellow light color of the light color emitted by the multi-color light emitting diode indicates medium percentage of renewable power used in the vehicle charging.

In one or more embodiments, red light color of the light color emitted by the multi-color light emitting diode indicates low percentage of renewable power used in the vehicle charging.

In one or more embodiments, a light color emitted by the multi-color light emitting diode is indicative of a cost of electrical power used in the vehicle charging.

In one or more embodiments, green light color of the light color emitted by the multi-color light emitting diode indicates low cost of electrical power used in the vehicle charging.

In one or more embodiments, yellow light color of the light color emitted by the multi-color light emitting diode indicates medium cost of electrical power used in the vehicle charging.

In one or more embodiments, red light color of the light color emitted by the multi-color light emitting diode indicates high cost of electrical power used in the vehicle charging.

In one or more embodiments, the visual indicator comprises a control for controlling the vehicle charging and wherein the visual indicator is configured to send a vehicle charging command to the vehicle charging station.

In one or more embodiments, the charging command is sent to the vehicle charging station via the control server.

In one or more embodiments, the control server is a cloud server.

In one or more embodiments, the visual indicator connects to the control server via an application programming interface (API).

In accordance with another aspect of the embodiments described herein, there is provided a system for charging an electric or hybrid-electric vehicle, the system comprising: at least one vehicle charging station electrically connectable to the vehicle and operable to charge the vehicle using an electrical power; a visual indicator of a state of charge of the vehicle communicatively coupled to the at least one vehicle charging station; and a control server comprising at least one processing unit and a memory and communicatively coupled to the at least one vehicle charging station, wherein the visual indicator of the state of charge of the vehicle is operable to receive information on the state of charge of the vehicle from the vehicle charging station and to provide the received information to the user.

In one or more embodiments, the visual indicator comprises a multi-color light emitting diode.

In one or more embodiments, a light color emitted by the multi-color light emitting diode is indicative of the state of charge of the vehicle.

In accordance with another aspect of the embodiments described herein, there is provided a method for charging an electric or hybrid-electric vehicle, the system comprising: providing at least one vehicle charging station electrically connectable to the vehicle and operable to charge the vehicle using an electrical power; providing a visual indicator of a state of charge of the vehicle; and providing a control server comprising at least one processing unit and a memory and communicatively coupled to the at least one vehicle charging station and the visual indicator of the state of charge of the vehicle, wherein the visual indicator of the state of charge of the vehicle is operable to receive information on the state of charge of the vehicle from the control server and to provide the received information to the user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there is provided a remote visual indicator of a state of charging of an electric vehicle. In one or more embodiments, the aforesaid visual indicator incorporates a multi-color light source, such as a multi-color LED and uses the color of the emitted light to indicate the state of the EV/PHEV charging. In one or more embodiment, the aforesaid visual indicator incorporates one or more buttons or other user-activated controls configured to alter the charging of the EV/PHEV by the charging stations. In one or more embodiments, a sound generation element may be additionally provided for creating audible indicators of charging state.

Figure 1:
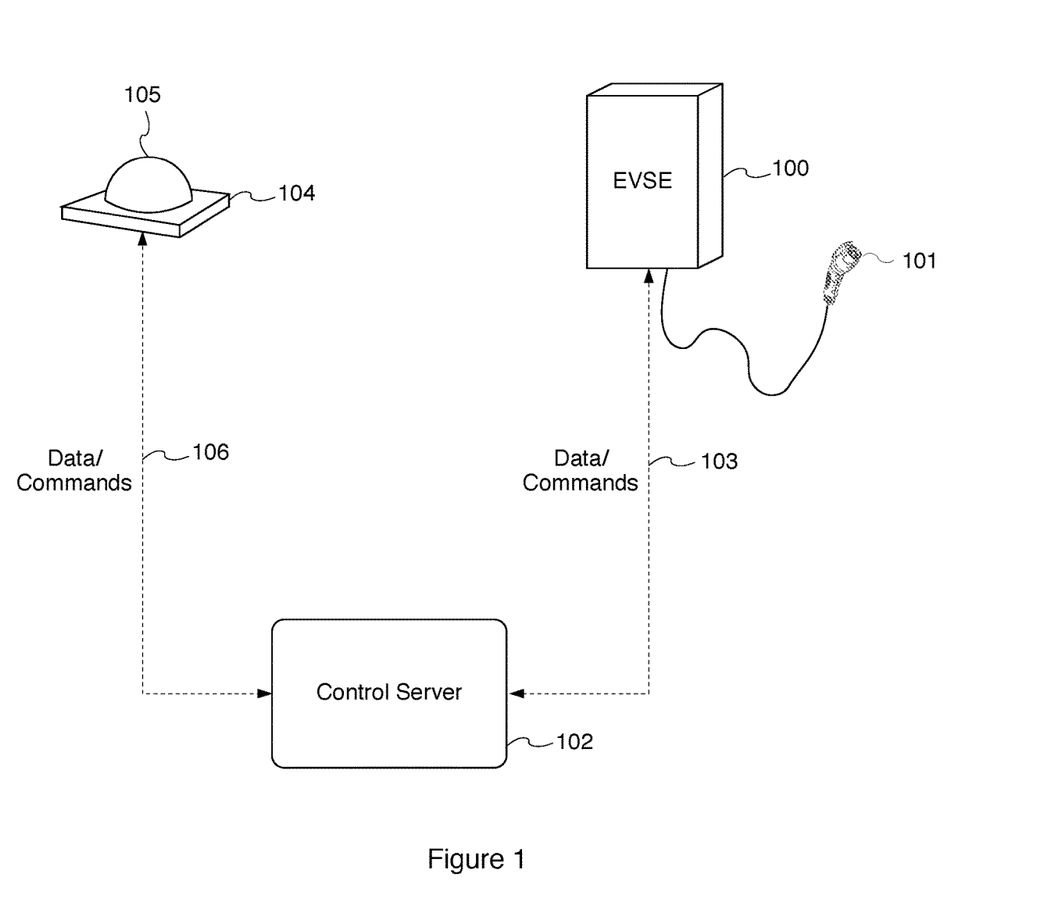
FIG. 1 illustrates an exemplary embodiment of an EV/PHEV home charging system incorporating a visual indicator of charging of EV/PHEV.

FIG. 1 illustrates an exemplary embodiment of an EV/PHEV home charging system incorporating a visual indicator of charging of EV/PHEV. In the embodiment shown in FIG. 1, electric or hybrid vehicle (EV/PHEV, not shown) is connected to and being charged by electric vehicle supply equipment (EVSE) 100 through a vehicle charge plug 101. The EVSE 100 is communicatively connected via a data link 103, to a control server (102) and sends telemetry to, and receives charging control commands from this control server (102). It should be noted that in the system shown in FIG. 1, the EVSE 100 may or may offer a separate user interface (UI). The data link 103 may be a wired or wireless network, such as Ethernet, GSM or WIFI.

In the embodiment shown in FIG. 1, a visual indicator of charging of EV/PHEV 104 is provided to furnish the user with information on the state of charging of the vehicle. In one or more embodiments, the visual indicator 104 is equipped with a multi-color light source 105 for indicating the state of charge of the EV/PHEV. In one embodiment, the visual indicator 104 is connected via a data link 106 to the control server 102. In one embodiment, the visual indicator 104 connects to the control server 102 via an application programming interface (API).

The visual indicator 104 is configured to receive various charge-related data, such as EV/PHEV charge level, charge current, percentage of green power used for EV/PHEV charging, the current cost of the electricity, electrical grid load, and the like information from the control server 102. As would be appreciate by persons of ordinary skill in the art, the described invention is not limited to specific charging or electrical grid data received by the visual indicator 104. In one or more embodiments, the data link 103 may be a wired or wireless network, such as Ethernet, GSM or WIFI. In various embodiments, the control server may be a cloud server.

The visual indicator 104 is configured to receive the EV/PHEV charge-related information from the control server 102 and to relay this information to the user. In one embodiment, the EV/PHEV charge-related information is relayed to the user using the multi-color light source 105. Specifically, the visual indicator 104 may be configured to vary the light color of the multi-color light source 105 based on the received EV/PHEV charge-related information.

In one exemplary embodiment, the visual indicator 104 may be configured to use the color of the light emitted by the multi-color light source 105 to indicate the level of charging of the EV/PHEV battery. In one embodiment, the green color indicates a substantially fully charged battery, yellow light color indicates medium charge level, and red light color indicates a low charged battery.

In another exemplary embodiment, the visual indicator 104 may be configured to use the color of the light emitted by the multi-color light source 105 to indicate the portion of the electrical power obtained from renewable (green) energy sources used for charging of the EV/PHEV battery. In one embodiment, the green color indicates a relatively high percentage (e.g. more than 30%) of the renewable (green) energy, yellow light color indicates medium percentage (e.g.

10-30%) of the renewable (green) energy and red light color indicates a low percentage (e.g. 0-10%) of the renewable (green) energy.

In yet another exemplary embodiment, the visual indicator 104 may be configured to use the color of the light emitted by the multi-color light source 105 to indicate the cost of electrical power used in charging of the EV/PHEV battery. In one embodiment, the green color indicates a relatively low cost (e.g. less than 12 cents per kilowatt) of the energy, yellow light color indicates medium cost (e.g. more than 12 cents per kilowatt but less than 15 cents per kilowatt) of the energy and red light color indicates a high cost (e.g. more than 15 cents per kilowatt) of the energy used for charging of the EV/PHEV.

In yet another exemplary embodiment, the visual indicator 104 may be configured to use the color of the light emitted by the multi-color light source 105 to indicate the quality of grid power used in charging of the EV/PHEV battery. In one embodiment, the green color indicates a relatively low quality of grid power, yellow light color indicates medium quality of grid power and red light color indicates a high quality of grid power used for charging of the EV/PHEV.

As would be apparent to persons of ordinary skill in the art, the described invention is not limited by the specific charging or electrical grid data indicated by the visual indicator 104 and any such data may be used in connection therewith. In one or more embodiment, the visual indicator 104 incorporates one or more buttons or other user controls for issuing commands to the EVSE 100 via the control server 102. In one embodiment, the issued command may be vehicle charge-related, such as starting or stopping the vehicle charge process. In another embodiment, the controls may be user to adjust the rate of charge of the EV/PHEV. As would be apparent to persons of ordinary skill in the art, the described invention is not limited by the specific commands that could be sent from the visual indicator 104 to the EVSE 100 via the control server 102.

Figure 2:
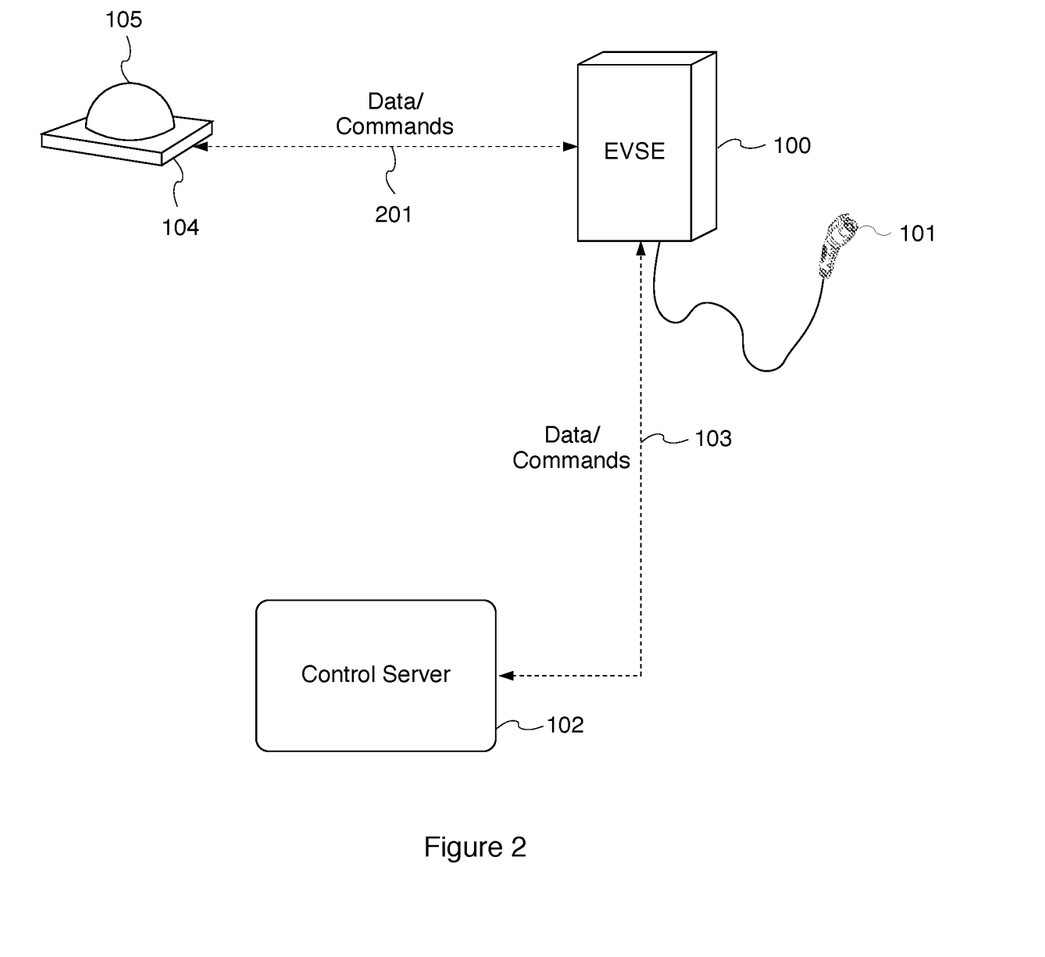
FIG. 2 illustrates another exemplary embodiment of an EV/PHEV home charging system incorporating a visual indicator of charging of EV/PHEV.

FIG. 2 illustrates another exemplary embodiment of an EV/PHEV home charging system incorporating a visual indicator of charging of EV/PHEV. In this embodiment, the visual indicator 104 is communicatively coupled directly to EVSE 100 via a data link 201. In one or more embodiments, the data link 201 may be a wired or wireless network, such as Ethernet, GSM or WIFI. In this embodiment, the visual indicator 104 may receive the charge or grid data and send commands directly from/to the EVSE 100.

Figure 3:
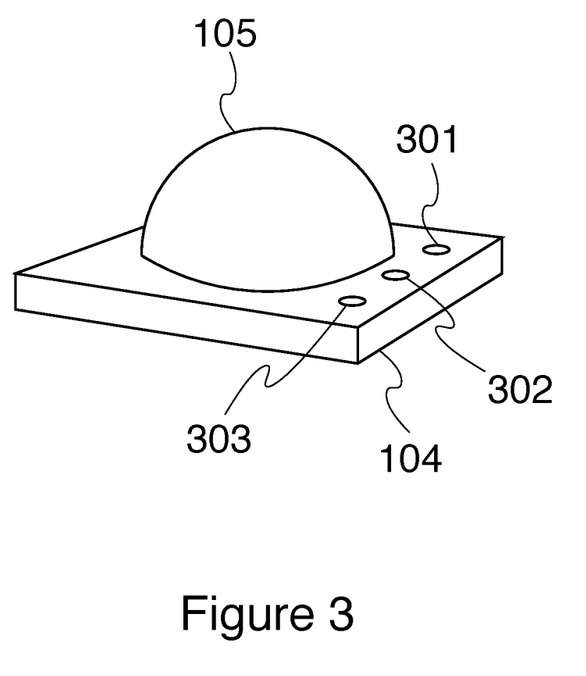
FIG. 3 illustrates an exemplary embodiment of a visual indicator of charging of EV/PHEV.

FIG. 3 illustrates an exemplary embodiment of a visual indicator of charging of EV/PHEV. In this embodiment, the visual indicator 104 incorporates a multi-color light source 105, such as a multi-color LED, and a plurality of user controls 301, 302 and 303. In various embodiments, the user controls 301, 302 and 303 may be used by the owner of the EV/PHEV to alter one or more aspects of the charging of the vehicle. In various embodiments, the visual indicator 104 may additionally incorporate a sound emitter for creating audible indicators of vehicle charging state, such as chimes or pings.

Exemplary Computer Platform

Figure 4:
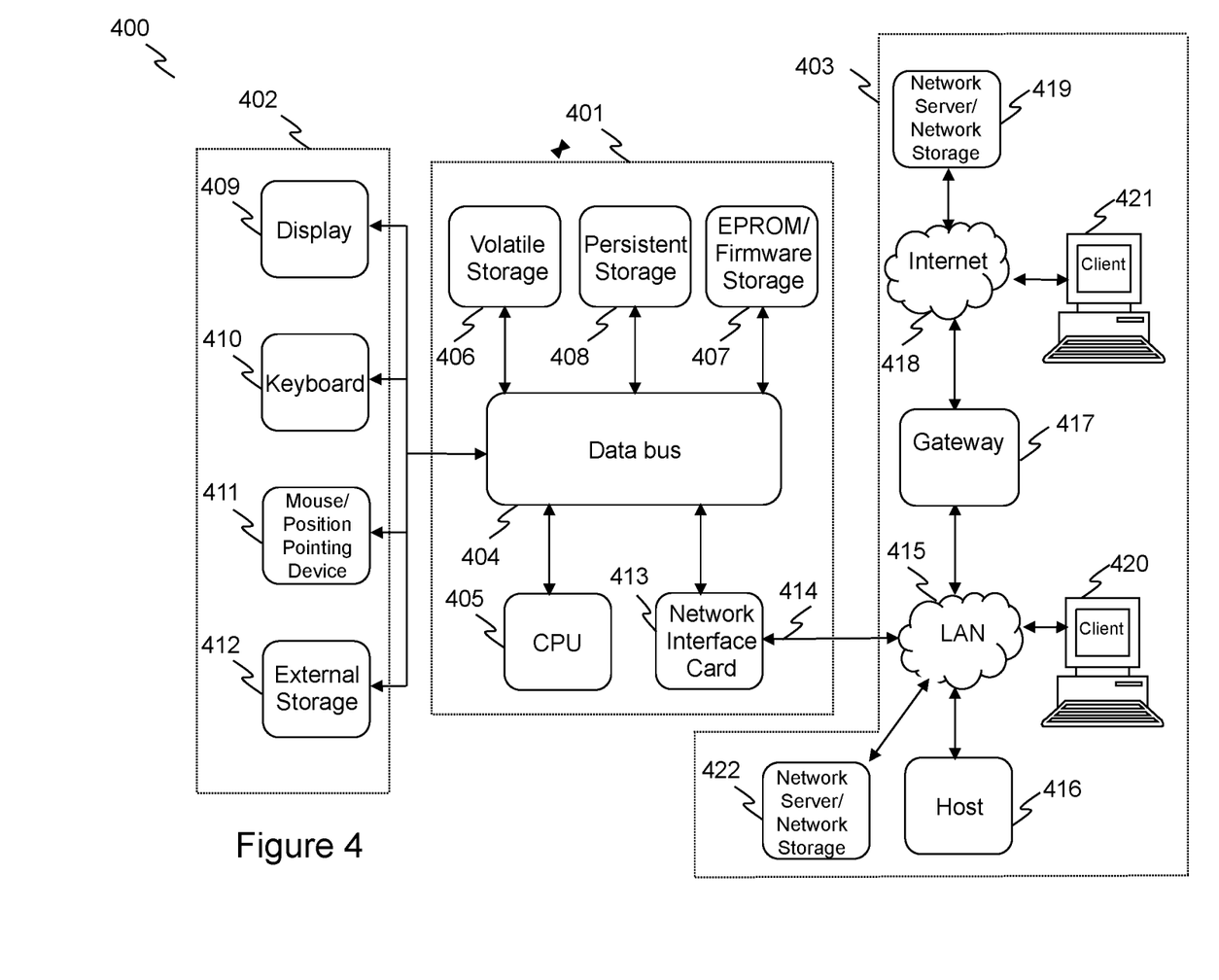
FIG. 4 is a block diagram that illustrates an embodiment of a computer/server system upon which an embodiment of the inventive technology may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403. As would be appreciated by persons of ordinary skill in the art, various embodiments described hereinabove may be deployed based on the aforesaid computer/server system 400.

The computer platform 401 may include a data bus 405 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 405 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 405 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 405 and for controlling cursor movement on display 409. This input device typically has two degrees of freedom in two axes, a first axis (e.g., x) and a second axis (e.g., y), that allows the device to specify positions in a plane.

An external storage device 412 may be coupled to the computer platform 401 via bus 405 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 408. Volatile media includes dynamic memory, such as volatile storage 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 405. The bus 405 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 405. Communication interface 413 provides a two-way data communication coupling to a network link 415 that is coupled to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 413 sends and receives electrical, electromagnetic or optical signals that carry digital data streams representing various types of information.

Network link 415 typically provides data communication through one or more networks to other network resources. For example, network link 415 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 415 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 415 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in a remote visual indicator of a state of charging of an electric vehicle. It is intended that the specification and examples be considered as exemplary only, with a true scope and spirit of the invention being indicated by the following claims.

What is claimed is:

1. A system for charging an electric or hybrid-electric vehicle, the system comprising:
   at least one vehicle charging station electrically connectable to the vehicle and operable to charge the vehicle using an electrical power;
   a visual indicator device configured to display a visual indicator of a state of charge of the vehicle, a visual indicator of a proportion of the electrical power obtained from a renewable energy source, and a visual indicator of a quality of the electrical power; and
   a control server comprising at least one processor and a memory and communicatively coupled to the at least one vehicle charging station and the visual indicator device,
   wherein the visual indicator device is operable to receive information on the state of charge of the vehicle from the control server, display the visual indicator of the state of charge of the vehicle using the received information, display the visual indicator of the proportion of the electrical power obtained from a renewable energy source, and display the visual indicator of the quality of the electrical power, and
   wherein the visual indicator device is configured to send a vehicle charging command to the at least one vehicle charging station.

2. The system for charging an electric or hybrid-electric vehicle of claim 1, wherein a color of the visual indicator of the state of charge of the vehicle is indicative of the state of charge of the vehicle.

3. The system for charging an electric or hybrid-electric vehicle of claim 2, wherein green color of the visual indicator of the state of charge of the vehicle indicates high level of vehicle charging.

4. The system for charging an electric or hybrid-electric vehicle of claim 2, wherein yellow color of the visual indicator of the state of charge of the vehicle indicates medium level of vehicle charging.

5. The system for charging an electric or hybrid-electric vehicle of claim 2, wherein red color of the visual indicator of the state of charge of the vehicle indicates low level of vehicle charging.

6. The system for charging an electric or hybrid-electric vehicle of claim 1, wherein green color of the visual indicator of the proportion of the electrical power obtained from a renewable energy source indicates high percentage of renewable power used in the vehicle charging.

7. The system for charging an electric or hybrid-electric vehicle of claim 1, wherein yellow color of the visual indicator of the proportion of the electrical power obtained from a renewable energy source indicates medium percentage of renewable power used in the vehicle charging.

8. The system for charging an electric or hybrid-electric vehicle of claim 1, wherein red color of the visual indicator of the proportion of the electrical power obtained from a renewable energy source indicates low percentage of renewable power used in the vehicle charging.

9. The system for charging an electric or hybrid-electric vehicle of claim 1, wherein the visual indicator device is configured to display a visual indicator of a cost of the electrical power used to charge the vehicle, wherein a color of the visual indicator is indicative of the cost of the electrical power used in the vehicle charging.

10. The system for charging an electric or hybrid-electric vehicle of claim 9, wherein green color of the visual indicator of the cost of the electrical power used to charge the vehicle indicates low cost of electrical power used in the vehicle charging.

11. The system for charging an electric or hybrid-electric vehicle of claim 9, wherein yellow color of the visual indicator of the cost of the electrical power used to charge the vehicle indicates medium cost of electrical power used in the vehicle charging.

12. The system for charging an electric or hybrid-electric vehicle of claim 9, wherein red color of the visual indicator of the cost of the electrical power used to charge the vehicle indicates high cost of electrical power used in the vehicle charging.

13. The system for charging an electric or hybrid-electric vehicle of claim 1, wherein the visual indicator device comprises a control for controlling the charging of the vehicle.

14. The system for charging an electric or hybrid-electric vehicle of claim 1, wherein the charging command is sent to the at least one vehicle charging station via the control server.

15. The system for charging an electric or hybrid-electric vehicle of claim 1, wherein the control server is a cloud server.

16. The system for charging an electric or hybrid-electric vehicle of claim 1, wherein the visual indicator device connects to the control server via an application programming interface (API).

17. A system for charging an electric or hybrid-electric vehicle, the system comprising:
at least one vehicle charging station electrically connectable to the vehicle and operable to charge the vehicle using an electrical power;
a visual indicator device configured to display a visual indicator of a state of charge of the vehicle, a visual indicator of a proportion of the electrical power obtained from a renewable energy source, and a visual indicator of a quality of the electrical power, the visual indicator device communicatively coupled to the at least one vehicle charging station; and
a control server comprising at least one processor and a memory and communicatively coupled to the at least one vehicle charging station,
wherein the visual indicator device is operable to receive information on the state of charge of the vehicle from the at least one vehicle charging station, display the visual indicator of the state of charge of the vehicle using the received information, display the visual indicator of the proportion of the electrical power obtained from a renewable energy source, and display the visual indicator of the quality of the electrical power,
wherein the visual indicator device is configured to send a vehicle charging command to the at least one vehicle charging station.

18. A method for charging an electric or hybrid-electric vehicle, the system comprising:
providing at least one vehicle charging station electrically connectable to the vehicle and operable to charge the vehicle using an electrical power;
providing a visual indicator device configured to display a visual indicator of a state of charge of the vehicle, a visual indicator of a proportion of the electrical power obtained from a renewable energy source, and a visual indicator of a quality of the electrical power; and
providing a control server comprising at least one processor and a memory and communicatively coupled to the at least one vehicle charging station and the visual indicator device,
wherein the visual indicator device is operable to receive information on the state of charge of the vehicle from the control server, display the visual indicator of the state of charge of the vehicle using the received information, display the visual indicator of the proportion of the electrical power obtained from a renewable energy source, and display the visual indicator of the quality of the electrical power, and
wherein the visual indicator device is configured to send a vehicle charging command to the at least one vehicle charging station.

19. The system for charging an electric or hybrid-electric vehicle of claim 1, wherein the visual indicator device is configured to send a vehicle charging command to the at least one vehicle charging station that starts charging of the vehicle.

20. The system for charging an electric or hybrid-electric vehicle of claim 19, wherein the visual indicator device is configured to send a vehicle charging command to the at least one vehicle charging station that stops charging of the vehicle.

* * * * *